United States Patent [19]

Ohkubo et al.

[11] Patent Number: 5,024,082

[45] Date of Patent: Jun. 18, 1991

[54] ENGINE-START DISCRIMINATING APPARATUS FOR AN INTERNAL COMBUSTION ENGINE

[75] Inventors: Satoru Ohkubo; Shoichi Washino, both of Amagasaki, Japan

[73] Assignee: Mitsubishi Denki Kabushiki Kaisha, Tokyo, Japan

[21] Appl. No.: 421,031

[22] Filed: Oct. 13, 1989

[30] Foreign Application Priority Data

Oct. 24, 1988 [JP] Japan ............................ 63-267393

[51] Int. Cl.5 ........................................ G01M 15/00

[52] U.S. Cl. ................................ 73/117.3; 123/435

[58] Field of Search ...................... 73/117.3, 116, 115; 123/435

[56] References Cited

U.S. PATENT DOCUMENTS 4,583,507 4/1986 Greeves et al. .................. 73/116 X
4,602,506 7/1986 Sawamoto et al. .................. 73/115

OTHER PUBLICATIONS

Engine Dynamics Pressure Measurement Technique Update Jidosha Gijutsu, published Nov. 1984, vol. 38, pp. 1278–1284.

New Trends in Electronic Engine Control to the Next Stage, Yoshitaka Hata et al., Nissan Motor Co. Ltd., pp. 155–165.

*Primary Examiner*—Jerry W. Myracle
*Attorney, Agent, or Firm*—Sughrue, Mion, Zinn, Macpeak & Seas

[57] ABSTRACT

An engine-start discriminating apparatus which comprises a cylinder pressure sensor for detecting a cylinder pressure in an internal combustion engine, a combustion parameter operating component for extracting for an arithmetic operation a parameter of combustion indicating a state of combustion in the engine on the basis of the output signal of the cylinder pressure sensor, and a start discriminating component for discriminating the starting of the engine on the basis of the output of the operating component.

5 Claims, 5 Drawing Sheets

FIGURE 2
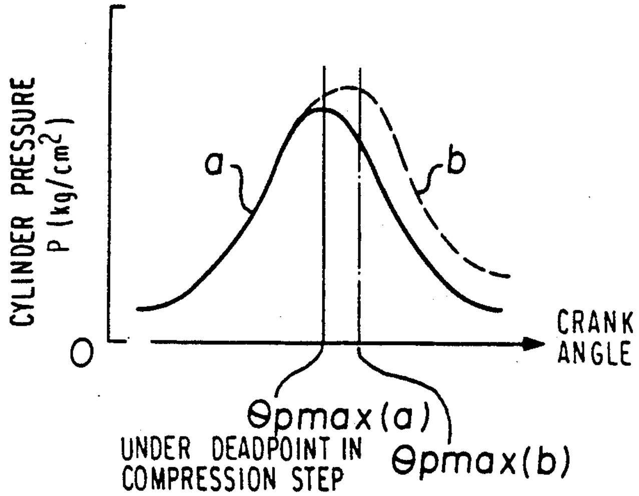
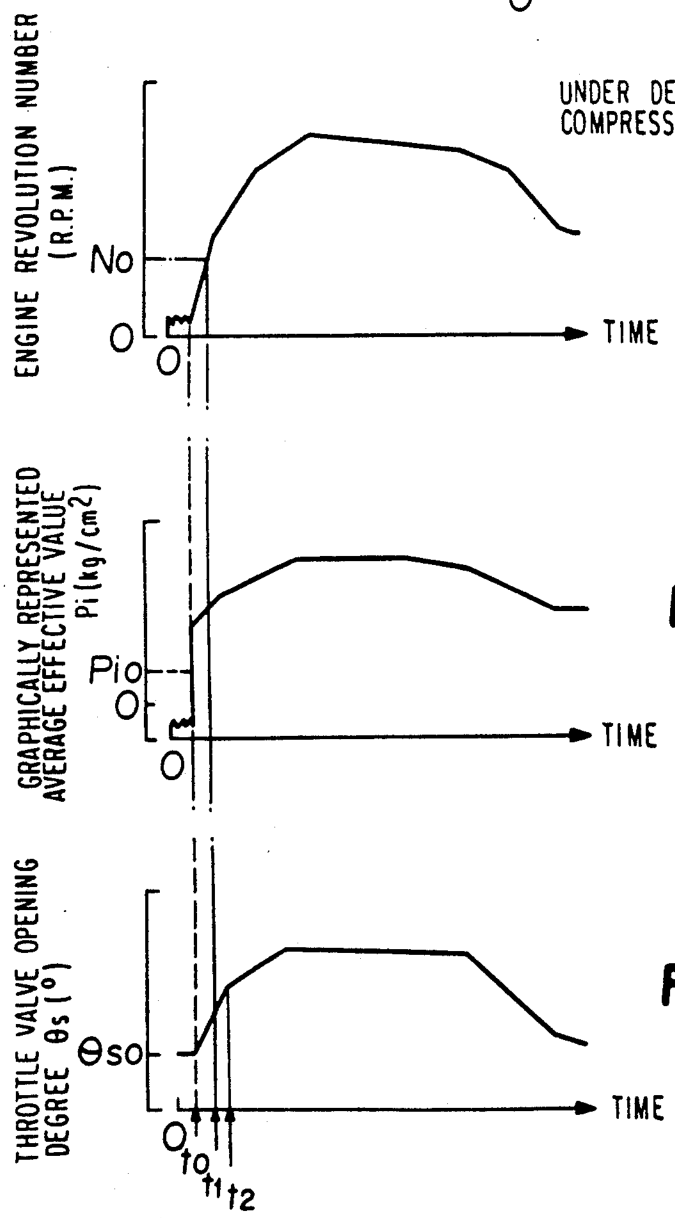
FIGURE 3a
FIGURE 3b
FIGURE 3c

ENGINE-START DISCRIMINATING APPARATUS FOR AN INTERNAL COMBUSTION ENGINE

BACKGROUND OF THE INVENTION

1. Field of the Invention

The present invention relates to a engine-start discriminating apparatus for an internal combustion engine mounted on, for instance, an automobile.

2. Discussion of Background

In a conventional engine-start discriminating apparatus disclosed in, for instance, Japanese Unexamined Patent Publication 107034/1980, the starting of an internal combustion engine (hereinbelow, referred to as an engine) has been generally discriminated by detecting that the revolution number has increased to a predetermined number or more. A revolution number detecting means used for detecting a predetermined revolution number is disclosed in, for instance, Japanese Unexamined Patent Publication 212643/1985, and it will be described with reference to FIG. 6.

In FIG. 6, a reference numeral 1 designates an air cleaner, a numeral 2 designates air-flow meter to detect an amount of air to be sucked, a numeral 3 designates a throttle valve, a numeral 4 designates an intake manifold, a numeral 5 designates a cylinder, a numeral 6 designates a water temperature sensor to detect the temperature of cooling water for the engine, a numeral 7 designates a crank angle sensor, a numeral 8 designates an exhaust manifold, a numeral 9 designates an exhaust gas sensor to detect the concentration of an exhaust gas component (such as the concentration of oxygen), a numeral 10 designates a fuel injection valve, a numeral 11 designates an ignition plug, and a numeral 12 designates a control device.

The crank angle sensor is adapted to output a reference position pulse at every reference position of the crank angle (for instance, every 180° for a four cylinder engine and every 120° for a six cylinder engine) and to output a unit angle pulse at every unit angle (for instance, every 1°). The control device 12 counts the number of the unit angle pulses upon receiving a reference position pulse to thereby obtain the crank angle. Further, a revolution speed of engine is obtainable by measuring the frequency or the period of the unit angle pulses.

In the apparatus shown in FIG. 6, the crank angle sensor 7 is installed in a distributor.

The control device 12 is constituted by a microcomputer consisting, for instance, of a CPU, a RAM, a ROM, and an input/output interface and so on.

The control device 12 receives a signal of intake air quantity $S_1$ from the air-flow meter 2, a signal of water temperature $S_2$ from the water temperature sensor 6, a crank angle signal $S_3$ from the crank angle sensor, and a signal of exhaust gas $S_4$ from the exhaust gas sensor 9. The control device 12 also receives a signal of battery voltage and a signal indicative of the throttle valve being fully closed although the signals are not shown in FIG. 6. The control device operates with reference to the input signals to calculate a fuel injection quantity to be supplied to the engine, whereby a fuel injection signal $S_5$ is generated. The signal $S_5$ actuates a fuel injection valve 10 to thereby feed a predetermined amount of fuel to the engine. In particular, when the engine is started, (i.e. in cranking operation caused by a starter), a thick mixture gas containing a large amount of fuel is supplied. When the starting of the engine is discriminated by the revolution number detecting means which detects the fact that the revolution number of the engine has increased, the gas mixture is made thin to be an air-fuel ratio suitable for the operation of the engine after starting, and the throttle valve, which is opened for idling operations, is further opened for warming operations.

In the conventional apparatus, when the starting of the engine is discriminated by detecting the increase of the revolution number, it takes time until the engine reaches a predetermined increased number of revolution, whereby discrimination of the starting of the engine is delayed and quick control can not be obtained.

SUMMARY OF THE INVENTION

It is an object of the present invention to provide an engine-start discriminating apparatus for an internal combustion engine capable of discriminating the starting of the engine without delay.

The foregoing and the other objects of the present invention have been attained by providing an engine-start discriminating apparatus which comprises a cylinder pressure sensor for detecting a cylinder pressure in an internal combustion engine, a combustion parameter operating means for extracting, for an arithmetic operation, a parameter of combustion indicating a state of combustion in the engine on the basis of the output signal of said cylinder pressure sensor, and a start discriminating means for discriminating the starting of the engine on the basis of the output of the operating means.

BRIEF DESCRIPTION OF DRAWINGS

A more complete appreciation of the invention and many of the attendent advantages thereof will be readily obtained as the same becomes better understood by reference to the following detailed description when considered in connection with the accompanying drawings, wherein:

FIG. 2 is a characteristic diagram of a parameter of combustion;

FIG. 3 (including FIGS. 3*a*–3*c*) includes characteristic diagrams of cylinder pressure.

DETAILED DESCRIPTION OF PREFERRED EMBODIMENT

Figure 1:
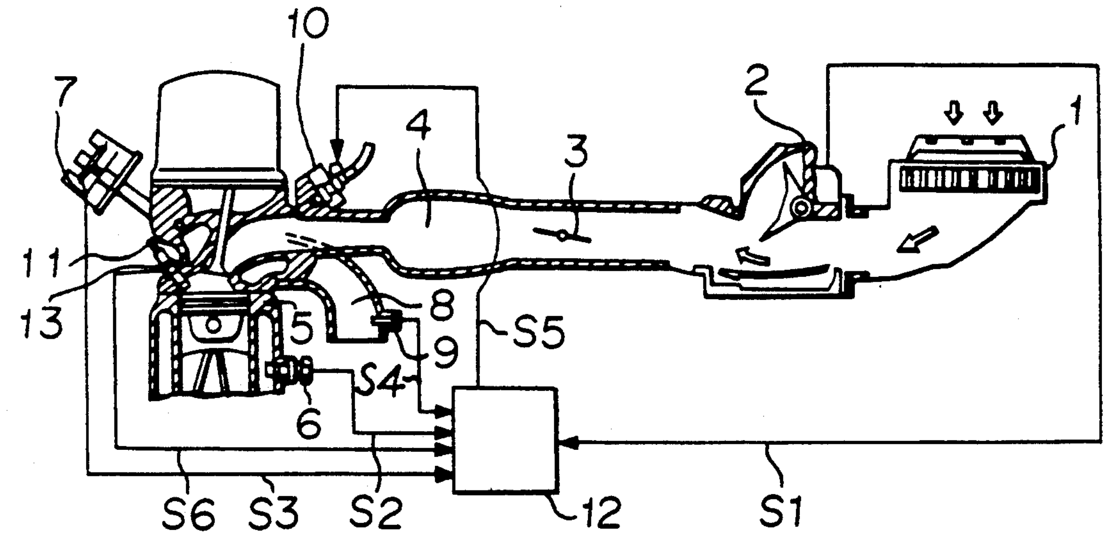
FIG. 1 is a diagram of an embodiment of the engine-start discriminating apparatus for a internal combustion engine according to the present invention.

Referring to the drawings, wherein the same reference numerals designate the same or corresponding parts, and more particularly to FIG. 1 thereof, there is shown a diagram of an embodiment of the engine-start discriminating apparatus of the present invention. In FIG. 1, a reference numeral 13 designates a cylinder pressure sensor for detecting pressure in a cylinder. The cylinder pressure sensor 13 is used for a seat member for an ignition plug 11 and is adapted to detect changes in pressure in the cylinder and to generate an electric signal. A control device 12 is constituted by, for instance, a microcomputer which is adapted to receive a signal of intake air quantity $S_1$ from the air-flow meter 2, a signal of water temperature $S_2$ from the water temperature sensor 6, a crank angle signal $S_3$ from the crank angle sensor, a signal of exhaust gas $S_4$ from the exhaust gas sensor 9, and a pressure signal $S_6$ from the cylinder pressure sensor 13. The control device 12 performs an operations for calculation and outputs a fuel injection signal $S_5$ so that the fuel injectin valve 10 is controlled.

The operation of the engine-start discriminating apparatus of the present invention will be described. At the time of starting, the control device 12 receives the crank angle signal $S_3$ and the cylinder pressure signal $S_6$ to operate for calculation a parameter of combustion which is contained in the waveform of the cylinder pressure signal by which a state of the starting of the engine can be discriminated. The parameter of combustion is such that the state of combustion of the engine can be detected. For instance, the parameter of combustion is one selected from the group consisting of the maximum value of cylinder pressure ($P_{max}$), the position of crank angle giVen at the maximum value ($\theta P_{max}$), the maximum rate of increase of cylinder pressure ($dP/d\theta_{max}$), and a graphically represented average effective pressure (Pi), these having different values at the time of starting of the engine from those after the starting of the engine, hence, discrimination of the starting of the engine is possible.

FIG. 2 is a characteristic diagram of the parameter of combustion in which characteristic curves of the parameter at the time of starting and after the starting are respectively shown. As depicted by a solid curve line a, the waveform of the cylinder pressure signal assumes an symmetric form with respect to the upper dead point because a cranking operation is carried out by a starter at the time of the starting of the engine. Namely, a crank angle $\theta P_{max}$ (b) takes place at the upper dead point in a compression step in the engine. On the other hand, a crank angle $\theta P_{max}$ (b) takes place behind the upper dead point in the compression step because there occurs a pressure increase after the starting of the engine as seen in the waveform b. On the other hand, when a graphically represented average effective pressure Pi is to be obtained by calculation, it takes a negative value at the time of starting and it takes a positive value after the starting. The present invention is to utilize such characteristics and to discriminate the starting of the engine by comparing the value of a parameter of combustion with a predetermined reference value.

FIGS. 3*a* and 3*b* are respectively diagrams showing that there occurs a delay in determination of the starting of the engine when the discrimination is respectively carried out by using the number of revolution of the engine and by using the graphically represented average effective pressure $P_1$ as parameters of combustion. FIG. 3*a* shows that a time of ($t_1$-$t_0$) is required until the number of revolution of the engine reaches a reference value $N_0$ when the number of revolution is used as the parameter of combustion. On the other hand, the graphically represented average effective pressure immediately reaches a reference value $P_{io}$ without delay when the graphically represented average effective pressure $P_i$ is used as the parameter of combustion. In the case shown in FIG. 3*a*, there is a time delay of ($t_1$-$t_0$) until controlling operation is effected after the engine has been started. FIG. 3*c* is a diagram showing a relation of the degree of opening of the throttle valve to time. The starter is actuated at a point 0 in the time axis. The starting of the engine is detected at a point $t_0$. The throttle valve 3 is opened by a point $t_2$. Since the throttle valve is not moved toward the opening direction from the degree of opening in idling operation $\theta_0$ till the time point $t_1$ (the number of revolution after time point $t_2$ is for engine warming-up), there occurs engine stop before control of the revolution number for warming-up is started. Further, an excessive amount of fuel is supplied to the engine during a time of delay because an excessive air-fuel ratio is determined until the starting of the engine is detected.

Figure 4:
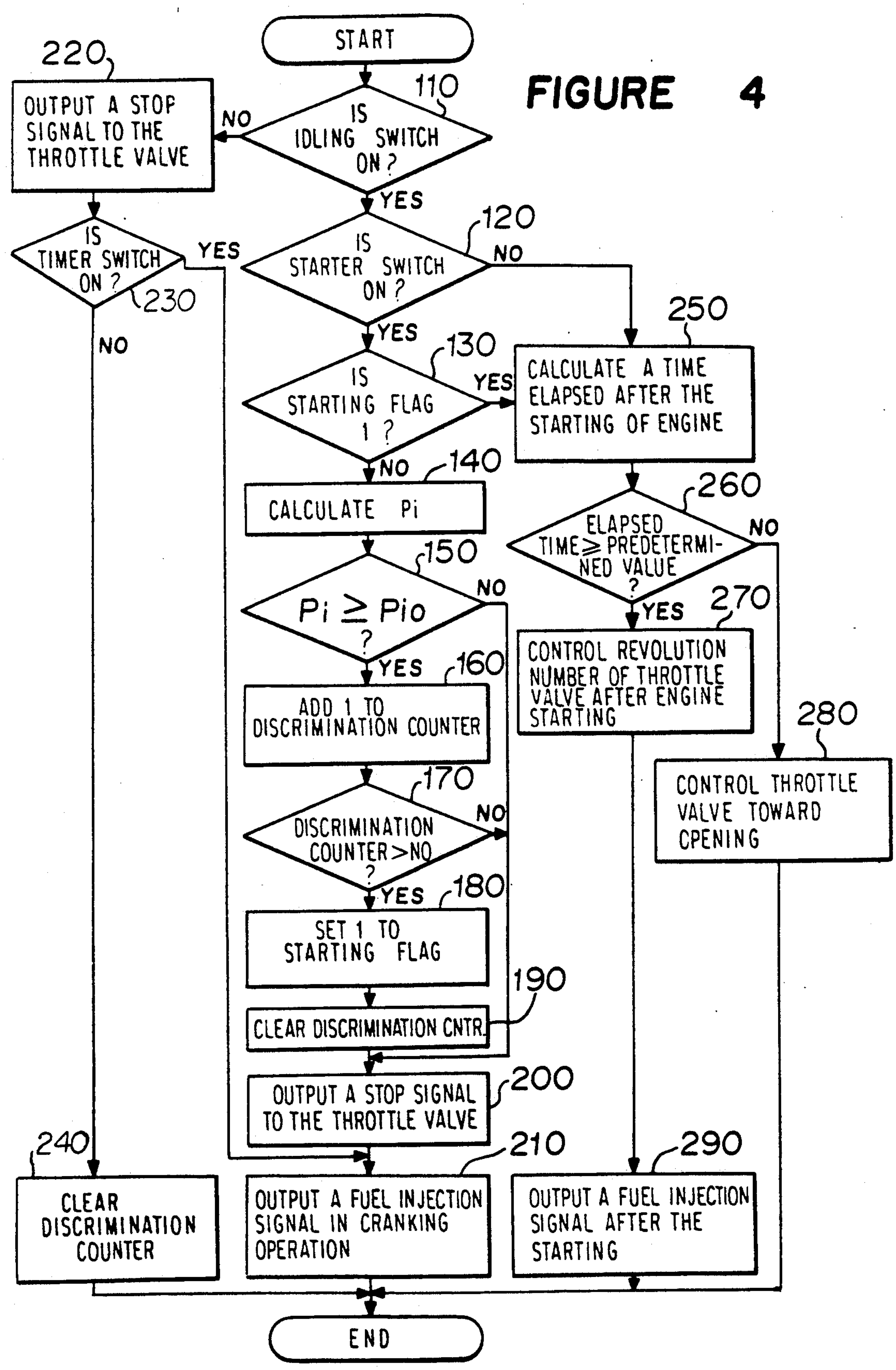
FIG. 4 is a flow chart showing an example of the operation of the discriminating apparatus of the present invention.

FIG. 4 is a flow chart showing the operation of the control apparatus according to the present invention in which the graphically represented average effective pressure $P_i$ is used as the parameter of combustion.

First of all, determination is made as to whether or not an idling switch is in an ON state at Step 110. Then, discrimination that the starter switch is in an ON state, discrimination that a starting flag is established, i.e. which the engine has been started, calculation of the graphically represented average effective pressure $P_i$ and discrimination of $P_i$ are successively carried out at Step 120, Step 130, Step 140 and Step 150 respectively. With respect to the calculation of $P_i$ at Step 140 will be described later in more detail with reference to FIG. 5.

From Step 160 to Step 190, discrimination of $P_i$ is conducted $n_0$ times. When the operations of $n_0$ times have achieved, the starting flag 1 is set. Thus, reliability to the discrimination is improved. When the engine is not found to be started, the throttle valve is stopped at Step 200, and a fuel injection signal suitable for cranking operations is outputted to the fuel injection valve 10 at Step 210.

In a case that the idling switch is in an ON state at Step 110, the starting switch is in an OFF state at Step 120 or the starting flag 1 is set at Step 130, then, sequential step goes to Step 250. The operations from Step 250 to Step 290 concern engine controlling operations after the time $t_0$ in FIG. 3. Namely, a time ($t_2$-$t_0$) after the starting of the engine is measured (Step 250); the throttle valve is opened (Step 260 and Step 270) and the revolution number of the engine is controlled. At Step 290, an amount of fuel is gradually decreased so that a mixture gas suitable for the engine after the starting is supplied to the fuel injection valve at the time $t_0$. When the idling switch is in an OFF state and the throttle valve 3 is opened at Step 110, the operations of the throttle valve are stopped as in Step 220 through Step 240, and the fuel injection signal $S_5$ suitable for the engine after the starting is supplied to the fuel injection valve 10.

Figure 5:
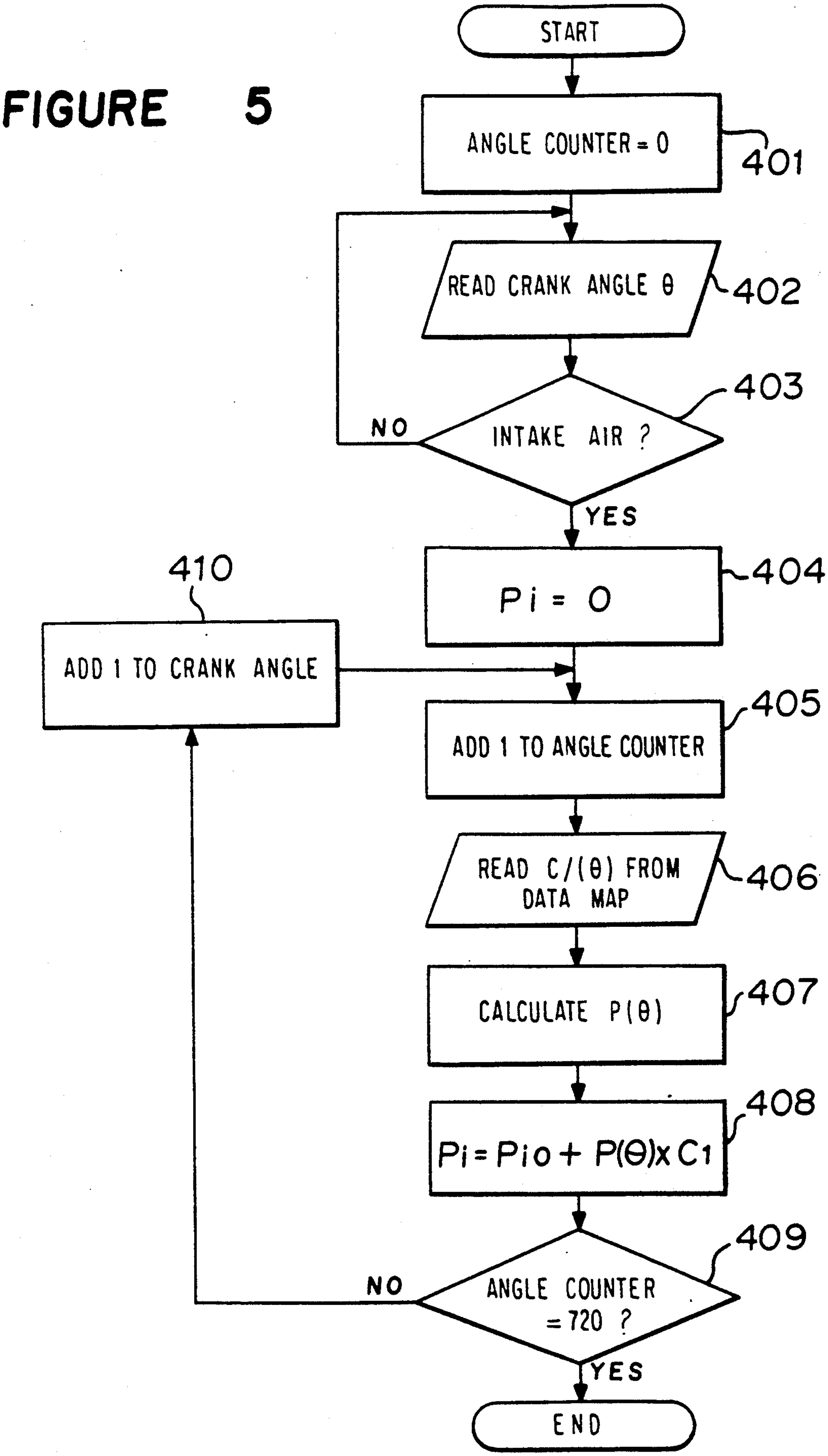
FIG. 5 is a flow chart for calculating a graphically represented average effective pressure.
Figure 6:
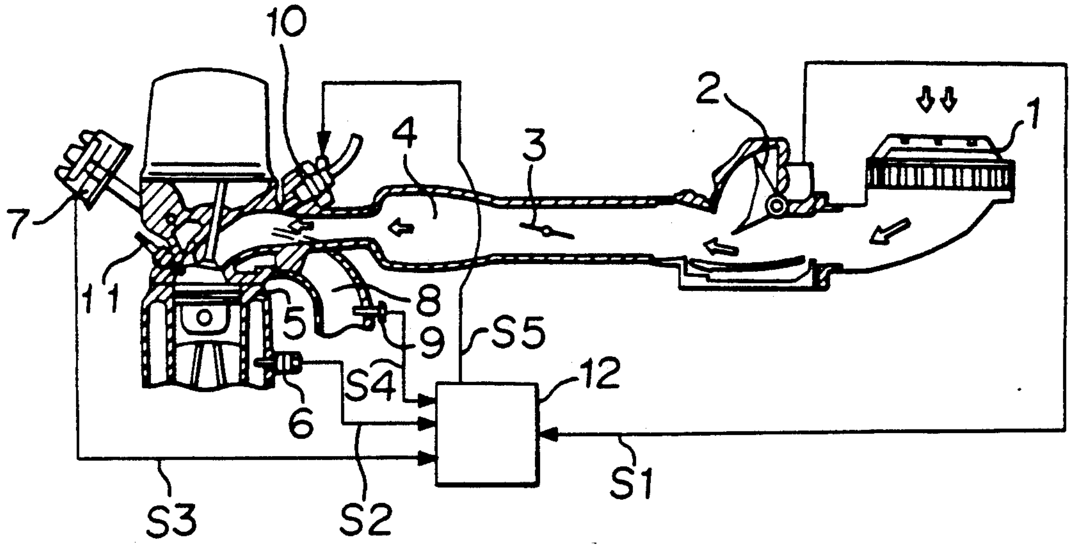
FIG. 6 is a diagram of a conventional engine-start discriminating apparatus.

FIG. 5 is a flow chart illustrating the content of Step 140 in which the graphically represented average effective pressure $P_i$ is obtained by calculation, in detail. The calculating formula of $P_i$ is as follows.

$$P_i = \left(\sum_{\theta=1}^{720} p(\theta) dV(\theta)\right) / V_s = \sum_{\theta=1}^{720} p(\theta)^* C_1(\theta) \quad (I)$$

where $dV(\theta)$ is a rate of change of the capacity of the cylinder at each crank angle and $V_s$ is the capacity of the stroke of the engine. Accordingly, an equation $C_1(\theta) = dV(\theta)/V_s$ is memorized in a memory in a form of map.

Namely, $P_i$ is obtainable by dividing a value of work performed by the engine during one cycle (two turns of crank shaft=720 deg) by the capacity of the stroke of the cylinder. The content of Step 140 is shown by a flow chart in FIG. 5. An angle counter is reset at Step 401 and a crank angle $\theta$ is read at Step 402. Then, determination is made as to whether or not the piston is at the upper dead point at Step 403. When "NO", Step 402 is taken again. When "Yes", the value of $P_i$ is cancelled at Step 404. A digital value "1" is added to the angle counter at Step 405, and the value $C_1(\theta)$ corresponding to the crank angle $\theta$ is read from the data map of $C_1$ at Step 406. $P(\theta)$ is measured at Step 407, and the above-mentioned equation (1) is operated at Step 408. Then, determination is made as to whether or not the angle counter reaches 720 at Step 409. When "NO", the crank angle $\theta$ is corrected to have the next crank angle. Then, the operations from Step 405 to Step 409 are repeated. When "Yes" at Step 409, calculation for $P_i$ is finished, and thus obtained value $P_i$ is passed to the main routine as in FIG. 4.

In the above-mentioned embodiment, explanation has been made as to only one cylinder of the engine. However, when a multi-cylinder engine is used, it is possible to conduct the discrimination of the starting of the engine by using the output signal of the cylinder pressure sensor 13 attached to each cylinder.

Thus, in accordance with the present invention, the discrimination of the starting of the engine can be made by using a parameter of combustion which is obtained by detecting a cylinder pressure, whereby it is possible to obtain accurate discrimination and quick control of the engine after the starting of it can be attained.

Obviously, numerous modifications and variations of the present invention are possible in light of the above teachings. It is therefore to be understood that within the scope of the appended claims, the invention may be practiced otherwise than as specifically described herein.

What is claimed is:

1. An engine-start discriminating apparatus which comprises:

a cylinder pressure sensor for detecting a cylinder pressure in an internal combustion engine;

a combustion parameter operating means for extracting a parameter of combustion indicating a state of combustion in the engine on the basis of the output signal of said cylinder pressure sensor; and a start discriminating means for discriminating the starting of the engine on the basis of the output of the operating means.

2. The engine-start discriminating apparatus according to claim 1, wherein said parameter of combustion is one selected from the group consisting of the maximum value of cylinder pressure ($P_{max}$), the position of the crank angle given at the maximum value ($\theta P_{max}$), the maximum rate of increase of cylinder pressure ($dP/d\theta max$) and a graphically represented average effective pressure (Pi).

3. The engine-start discriminating apparatus according to claim 1, wherein said cylinder pressure sensor constitutes a seat for an ignition plug attached to said engine.

4. An engine-start discriminating apparatus which comprises:

a cylinder pressure sensor for detecting a cylinder pressure in an internal combustion engine;

a combustion parameter operating means for extracting a parameters of combustion indicating a state of combustion in the engine on the basis of the output signal of said cylinder pressure sensor, wherein said parameters are one of the groups of: the maximum value of cylinder pressure ($P_{max}$) and the position of crank angle given at the maximum value ($\theta P_{max}$); and, the effective pressure (Pi); and a start discriminating means for discriminating the starting of the engine on the basis of the output of the operating means, by discriminating the starting of the engine when one of: the maximum value of cylinder pressure ($P_{max}$) and position of crank angle ($\theta P_{max}$) occurs at at least a predetermined position after a Top Dead Center (TDC) position; and, the effective pressure (Pi) exceeds a predetermined average effective pressure.

5. The engine-start discriminating apparatus according to claim 4, wherein said cylinder pressure sensor constitutes a seat for an ignition plug attached to said engine.

* * * * *